United States Patent [19]
Buynak et al.

[11] Patent Number: 5,737,417
[45] Date of Patent: Apr. 7, 1998

[54] VIDEOTAPE ANTI-COPYING ENCRYPTION SCHEME

[75] Inventors: William J. Buynak, Bayville, N.Y.; Michael A. Sterling, Woodland Hills, Calif.

[73] Assignee: Technicolor Videocassette, Inc., Camarillo, Calif.

[21] Appl. No.: 427,151

[22] Filed: Apr. 24, 1995

[51] Int. Cl.$^6$ .................................................. H04L 9/00
[52] U.S. Cl. .............................. 380/5; 380/10; 380/15
[58] Field of Search ............................ 380/5, 15, 10

[56] References Cited

U.S. PATENT DOCUMENTS

| | | | |
|---|---|---|---|
| 2,890,276 | 6/1959 | Luther et al. | 178/7.1 |
| 3,439,113 | 4/1969 | Walker | 178/5.1 |
| 3,440,338 | 4/1969 | Walker | 380/15 |
| 3,460,161 | 8/1969 | Waller et al. | 178/5.1 |
| 3,517,127 | 6/1970 | Grace | 178/69.5 |
| 3,530,232 | 9/1970 | Reiter et al. | 178/5.1 |
| 3,614,308 | 10/1971 | Iwai | 178/6.6 |
| 4,030,128 | 6/1977 | Perret | 360/33 |
| 4,100,575 | 7/1978 | Morio et al. | 358/120 |
| 4,121,242 | 10/1978 | Janko | 358/4 |
| 4,163,253 | 7/1979 | Morio et al. | 358/120 |
| 4,213,149 | 7/1980 | Janko | 358/153 |
| 4,286,281 | 8/1981 | Suzuki | 358/4 |
| 4,336,553 | 6/1982 | den Toonder et al. | 380/15 |
| 4,390,898 | 6/1983 | Bond et al. | 358/119 |
| 4,439,785 | 3/1984 | Loenard | 358/120 |
| 4,454,544 | 6/1984 | Abbott | 358/120 |
| 4,463,376 | 7/1984 | Osaka et al. | 358/120 |
| 4,475,129 | 10/1984 | Kagota | 358/310 |
| 4,488,176 | 12/1984 | Bond et al. | 358/141 |
| 4,488,183 | 12/1984 | Kinjo | 358/319 |
| 4,571,642 | 2/1986 | Hofstein | 360/37.1 |
| 4,577,216 | 3/1986 | Ryan | 358/19 |
| 4,626,890 | 12/1986 | Ryan | 358/19 |
| 4,631,603 | 12/1986 | Ryan | 360/37.1 |
| 4,673,981 | 6/1987 | Lippman et al. | 358/160 |
| 4,695,901 | 9/1987 | Ryan | 380/5 |
| 4,819,098 | 4/1989 | Ryan | 360/37.1 |
| 4,888,649 | 12/1989 | Kagota | 358/335 |
| 4,907,093 | 3/1990 | Ryan | 358/335 |
| 4,914,694 | 4/1990 | Leonard et al. | 380/5 |
| 4,924,498 | 5/1990 | Farmer et al. | 380/15 |
| 4,937,679 | 6/1990 | Ryan | 358/335 |
| 4,945,563 | 7/1990 | Horton et al. | 380/5 |
| 5,003,590 | 3/1991 | Lechner et al. | 380/5 |

(List continued on next page.)

FOREIGN PATENT DOCUMENTS 2042846  9/1980  Japan.

*Primary Examiner*—Salvatore Cangialosi
*Attorney, Agent, or Firm*—Lyon & Lyon LLP

[57] ABSTRACT

Anti-copying protection for video material is provided wherein at least one high-amplitude pulse is inserted into various lines of the video signal, in and immediately preceding the vertical interval associated with each field, during the process of preparing a master recording for use in the high-speed duplication of legitimate recordings of the video material. A preferred embodiment of the present system and method is directed to videotape-to-videotape anti-copying protection. A high-amplitude pulse is inserted in the back porch region of horizontal sync pulses, and immediately following certain equalizing and vertical sync pulses, at an intermediate stage in the mastering process, whereby the pulse is inserted into a separated luminance component of the video signal, which is later recombined with the chromenance signal. Such method allows for the insertion of an higher amplitude pulse than would otherwise be possible, and yields a pulse of the desired final width, without the occurrence of such undesirable effects as loss of color lock or darkening of the picture with respect to legitimate recordings. The resulting modified video material may be viewed properly on a TV receiver or other display, but when coping from the legitimate source is attempted, the copy will yield a video signal which is too distorted for proper viewing. A further modification of the value of negative-going horizontal sync pulses provides additional synchronization error in recorded copies of legitimately recorded video material so as to further render such materials effectively non-copiable.

11 Claims, 15 Drawing Sheets

U.S. PATENT DOCUMENTS

| | | | |
|---|---|---|---|
| 5,034,981 | 7/1991 | Leonard et al. | 380/5 |
| 5,058,157 | 10/1991 | Ryan | 380/11 |
| 5,130,810 | 7/1992 | Ryan | 358/310 |
| 5,134,496 | 7/1992 | Schwab et al. | 358/335 |
| 5,146,495 | 9/1992 | Son | 380/5 |
| 5,155,767 | 10/1992 | Noller | 380/5 |
| 5,157,510 | 10/1992 | Quan et al. | 358/335 |
| 5,179,452 | 1/1993 | Takahashi | 358/335 |
| 5,182,771 | 1/1993 | Munich et al. | 380/5 |
| 5,194,965 | 3/1993 | Quan et al. | 358/335 |
| 5,208,708 | 5/1993 | Mok | 360/60 |
| 5,212,723 | 5/1993 | Griesshaber | 380/11 |
| 5,243,411 | 9/1993 | Shirochi et al. | 358/12 |
| 5,251,041 | 10/1993 | Young et al. | 358/310 |
| 5,303,294 | 4/1994 | Kimoto et al. | 380/5 |
| 5,315,448 | 5/1994 | Ryan | 360/60 |
| 5,319,706 | 6/1994 | Mizukata et al. | 380/5 |
| 5,337,157 | 8/1994 | Nakata | 358/335 |
| 5,394,470 | 2/1995 | Buynak et al. | 380/5 |
| 5,402,488 | 3/1995 | Karlock | 380/5 |
| 5,477,276 | 12/1995 | Oguro | 348/595 |
| 5,521,978 | 5/1996 | Oguro | 380/5 |
| 5,523,853 | 6/1996 | Yamashita et al. | 380/5 |

NORMAL EQUALIZER PULSE

EQUALIZER FOLLOWED BY PEDESTAL PULSE

NORMAL HORZ. SYNC. PULSE

SYNC. PULSE FOLLOWED BY A PEDESTAL PULSE

VIDEOTAPE ANTI-COPYING ENCRYPTION SCHEME

FIELD OF THE INVENTION

The field of the present invention relates to encryption of video signals and, in particular, to a system and method for encrypting a video signal, to be placed legitimately onto a videotape(s), in order to effectively prevent useful copying of that signal on the legitimate videotape(s) to another videotape(s).

BACKGROUND OF THE INVENTION

The unauthorized reproduction of videotaped materials presents a major problem for the producers, manufacturers, and distributors of such materials. The value to these entities, and their incentives for continuing to provide videotaped materials, are directly related to their ability to effectively market these products and to recover their development and other costs through sale or rental. Without protections which inhibit the making of unauthorized copies of these materials, pirate companies could readily appropriate materials prepared legitimately and could profit through the distribution of copies of these materials. Further, since such pirate companies would not have had to incur the development and production expense associated with the original preparation of videotaped materials, they could discount prices charged and, thus, undercut the sales of legitimate videotape producers. This possibility erodes the value, to legitimate videotape producers, of preparing original videotape materials since they would be uncertain of recouping the production expenses while still realizing sufficient profits.

Although the actions of pirate companies may, in the short run, result in cheaper prices to the consumer, ultimately, the public does not benefit from such activity. In the first place, pirated copies of videotape materials are often of a lower quality than would be satisfactory to the viewing consumer—a factor which may also negatively impact the goodwill of legitimate videotape producers in cases where there is confusion as to the true source of such materials. More importantly, however, the public is harmed by the fact that pirate activities could result in fewer videotape materials being made available since few companies would likely continue to be willing to risk incurring the development, production, and distribution expenses without assurance that they would profit from the unfettered sale of their materials.

The availability of copyright protections for the unauthorized duplication of videotape materials, and the attendant incorporation into such materials of notices and warnings concerning violation of these rights, offer little solace to legitimate videotape producers. The fact that violations of copyrights through the unauthorized reproduction and sale of videotaped materials are virtually impossible to police, and that such rights can be expensive to enforce at best, necessitates that other forms of protection be devised and implemented. Consequently, videotape producers have turned to methods of protection which physically inhibit the copying of materials from one videotape to another videotape or other recording medium. Of concern with respect to any such methods, however, is the fact that legitimate videotaped materials must remain viewable by the user on conventional televisions, monitors, or other such displays. Accordingly, any anti-copying method must be operative only when an attempt to record the video signal from the recording medium (e.g., videotape) is made, not merely when the video signal is played back.

Since most video manufacturers cannot control the design of any, let alone all, of the video recording equipment, e.g., Videocassette Recorders (VCR's), manufactured, any anti-copying method must effectively be self-contained within the videotape or other recording medium (e.g., encrypted into the video signal) itself. It is particularly evident that modifications to VCR recording circuitry would not provide adequate solution to the problem of videotape piracy since it is the main purpose of VCR's to record video signals, and, attempts to design all VCR's to distinguish legitimate signals (i.e., those that the user is free to reproduce), from pirated signals (i.e., unauthorized copies) would be complex and would require universal standards applicable to both equipment manufacturers and video producers. Such situation is highly unlikely under present circumstances.

In light of the above factors, existing anti-copying methods have focussed on a variety of techniques for modifying the video signals reproduced legitimately on videotapes (or other recording media) in such a way that a video signal which cannot be played back on a display without significant distortion results when the original signal is copied; however, when the original signal itself is played back on a display, viewing of the signal is not significantly affected. Use of such methods, while not prohibiting copying of the original video signal, does inhibit copying since the resulting distortion when viewing a copy of such modified signal is annoying, at best, to the viewer. Indeed, a goal of such methods is to maximize the distortion resulting from a copied signal (and, thus, make viewing of such signal so annoying as to prevent copying in the first place), while not perceptibly affecting the viewing of the original signal at all.

One such method directed toward this latter goal is identified in U.S. Pat. No. 5,130,810 ('810 patent) to Ryan wherein pulses are inserted following the horizontal sync pulse in active video lines of a video signal recorded on videotape in order to effect the desired distortion from copies of that signal. The '810 patent describes the insertion of a pulse of amplitude 100 IRE units and width four microseconds in the active video lines (lines twenty-two through two-hundred-sixty-three of a video field), but not in the lines of the vertical interval (lines one through twenty-one). Such inserted pulses are intended to confuse the Automatic Gain Control (AGC) circuitry of a recording VCR such that the level of the signal is improperly recorded and, consequently, the signal is distorted when played back and viewed on a display. As these pulses are inserted into active video lines, however, their presence may also undesirably affect viewing of the original signal on a display. The '810 patent provides for distributed spacing of such pulses within the active video lines, i.e., every one of "n" lines as opposed to all lines in the active video, in order to reduce undesirable affects. The results of testing by the present inventors have indicated that placement of pulses in the active video lines only, as provided in the '810 patent, would not yield adequate anti-copying protection, and could result in distortion of the picture on many displays (e.g., TV receivers) even when the legitimate signal is played back.

U.S. Pat. No. 4,819,098 ('098 patent), also to Ryan, describes a similar pulse to that of the '810 patent, but provides for the insertion of such in a cluster of lines "at" the vertical blanking interval, which is defined therein as possibly including some active video lines (the specification suggests insertion of pulses in 20–30 lines; the vertical interval typically comprises 21 lines). The '098 patent further notes that the lines surrounding the vertical interval are often non-viewable and, thus, inclusion of additional pulses in these lines would provide negligible interference with playback of the legitimate signal. While attempting to address the problems associated with insertion of pulses in the active, viewable lines of the video signal, the '098 patent, like the '810 patent, suggests insertion of a pulse of 100 IRE units (i.e., the maximum white level) and four microseconds width.

Testing by the present inventors indicates that the amplitude and width values (100 IRE and 4 microseconds, respectively) identified in the preferred embodiment of the '810 and '098 patents may not provide the maximum distortion from playback of a copy of such signal, and may result in color loss and darkening of the picture when the original signal is played back. Of further relevance to the present system and method, if a signal with such inserted pulses is used as an input to certain equipment utilized for the preparation of master videotapes (e.g., a Sony MMV-800 VTR) prior to mass-duplication onto other videotapes, a loss of color lock may result when recording onto the master. As well, such mastering equipment incorporates a clamp limit such that the amplitude of the added pulse may not be increased to an optimum level for maximum distortion of a copied video signal.

Accordingly, the present system and method provides one or more of the following advantages and objects, intended in part to overcome the drawbacks identified above:

- to provide a system and method for encrypting a video signal, to be placed legitimately onto a videotape, in order to effectively prevent the useful copying thereof;
- to provide such a system and method whereby playback of a copy of such encrypted video signal is too distorted for proper viewing, while playback of the original video signal is appreciably unaffected;
- to provide such a system and method whereby a video signal may be optimally encrypted in the process of preparing masters for use in high-speed duplication of the video signal;
- to provide such a system and method in which the potential for loss of color lock is eliminated; and,
- to provide such a system and method which results in the maximum results over the broadest range of TV receivers and VCRs.

Other objects and advantages of the present invention will become apparent from a review of the accompanying drawings and the detailed description which follows.

SUMMARY OF THE INVENTION

The present invention is a system and method for encrypting a video signal, to be placed legitimately onto a videotape (s), in order to effectively prevent useful copying of that signal to another videotape(s).

In accordance with the present system and method, anti-copying protection of videotaped material is effected by the insertion of a high-amplitude pulse into the video signal as further described hereinbelow. This pulse is inserted in such manner as to cause the Automatic Gain Control (AGC) circuitry of a recording VCR to 'misread' the real video signal level when an attempt to copy the material to another videotape is made. Accordingly, upon playback of the copy tape, the signal is too distorted for proper viewing. Since typical viewing displays (e.g., TV receivers, monitors, etc.) do not incorporate AGC circuitry similar to that of VCR's, playback of the legitimate videotape is unaffected by the inserted pulse.

As will be further explained in the detailed description which follows, the high amplitude pulse is inserted immediately after the horizontal sync pulse (or other reference points which perform equivalent horizontal synchronization function) in each of lines two hundred fifty (at the end of one field) through line eighteen (at the beginning of the following field). The majority of such lines comprise non-active lines in the vertical interval associated with each video field; the remainder, though active lines, are typically non-viewable and, thus, any effects of the signal modifications herein proposed are not detectable when the legitimate video signal is played back on a TV receiver/monitor. When recording (i.e., copying onto another videotape) of the signal as modified herein is attempted, distortion of the signal level, including that of active, otherwise viewable lines, occurs in the recorded copy which, when played back on a TV receiver/monitor, effectively prevents viewing of the video material.

The high amplitude pulse herein is inserted into the video signal during the initial mastering process, involved in the mass-reproduction of legitimate videotapes, in such a manner as to preferably yield a maximum obtainable pulse of 130 IRE units magnitude (amplitude) and two (2) microsecond duration (width) in the final signal as duplicated onto videotapes for which anti-copy protection is desired. A preferred embodiment herein realizes this end through circuit modifications to the mastering equipment within the duplication system (which may, for example, comprise a high speed duplication system). Such circuit modifications effect the insertion of a pulse of 130 IRE units and three (3) microsecond duration into the luminance component of the video signal. Upon further processing and recombination of the luminance and chromenance components of the video signal, a pulse of 130 IRE units and two (2) microseconds duration (width) results in the final video signal output from the mastering equipment. Also, by inserting the high amplitude pulse in the separated luminance component available in the mastering equipment, otherwise possible color loss and darkening are minimized since the more sensitive circuitry associated with processing of the chromenance signal in the mastering equipment is bypassed. This signal is then duplicated onto multiple videotapes, or other recording media, for which anti-copy protection is desired.

A further feature of a preferred embodiment herein provides for the clipping of negative-going synchronization pulses from minus 40 to a limit of minus 30 IRE unit magnitude in order to assist in the loss of synchronization of the video signal, and thus effect further distortion, of any copy made of the signal as processed.

DETAILED DESCRIPTION OF THE PREFERRED EMBODIMENT

Figure 1:
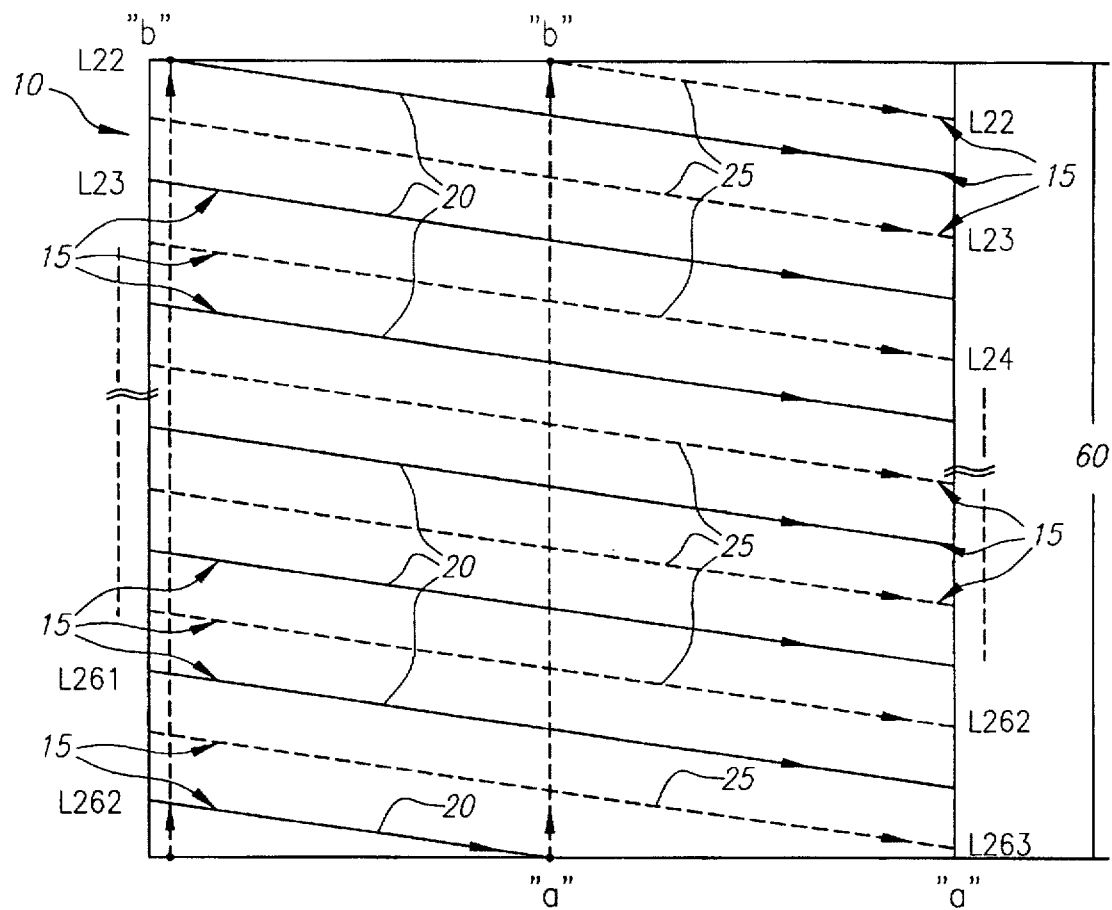
FIG. 1 illustrates how a screen image (one frame) is comprised of interleaved scan lines in two fields, and the line numbering associated therewith as referenced in accordance with a preferred embodiment herein.
Figure 2:
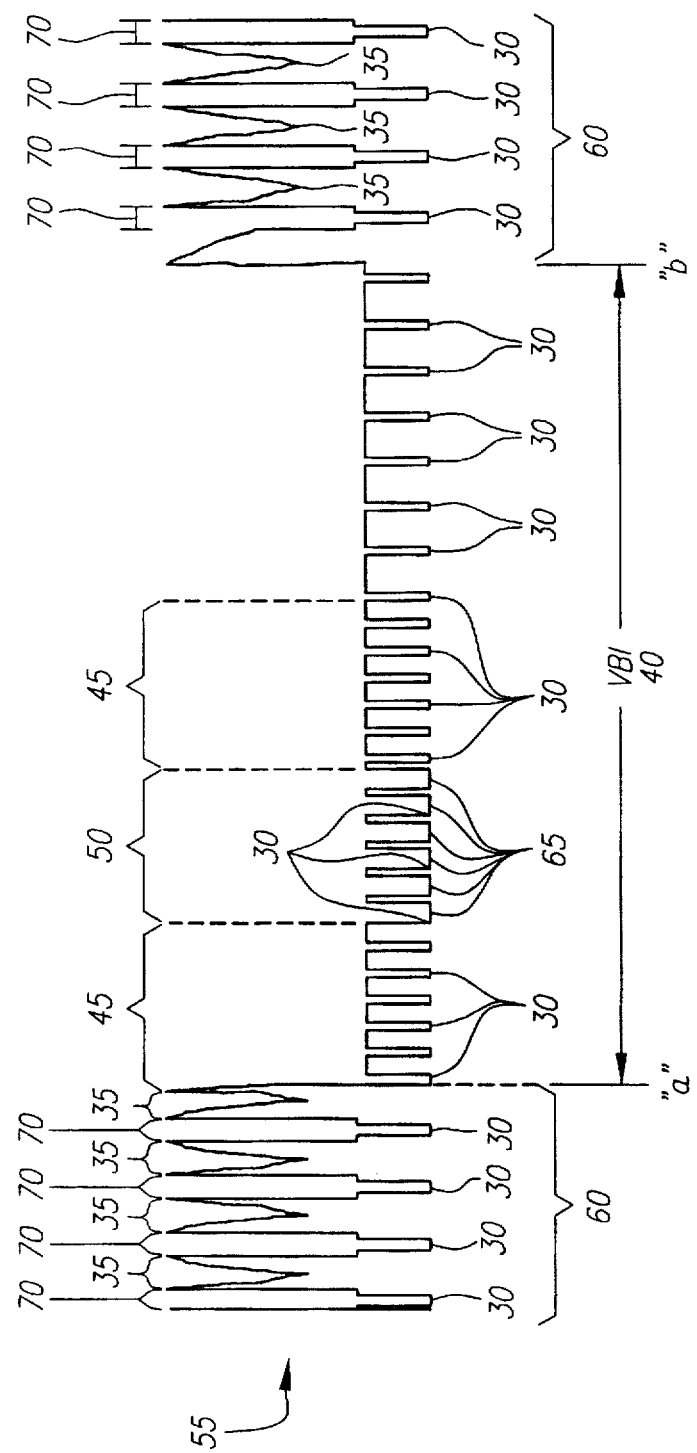
FIG. 2 is a simplified representation of that portion of the video signal comprising the vertical interval and including vertical sync, horizontal sync, and equalization pulses.
Figure 3:
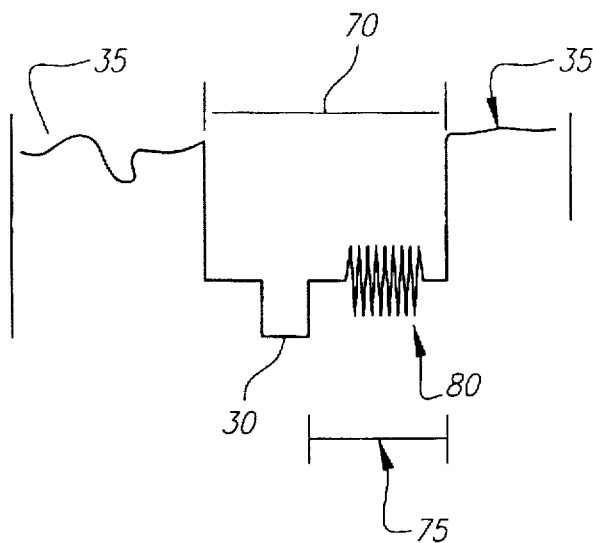
FIG. 3 represents that portion of the video signal immediately surrounding a typical horizontal sync pulse (including the color burst area in the "back porch" of the sync pulse) in an active line of a video signal.
Figure 5A:
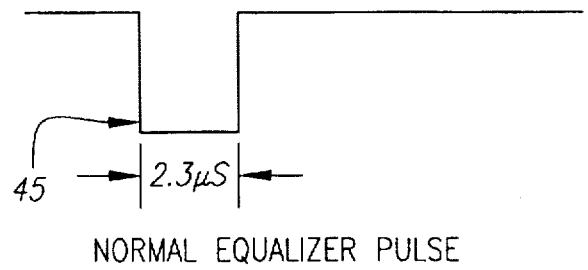
FIGS. 5(a) and 5(b) comparatively illustrate, respectively, a simplified, un-modified video signal equalizer pulse, and the same pulse as modified with a pedestal pulse following in accordance with the preferred embodiment herein.
Figure 5B:
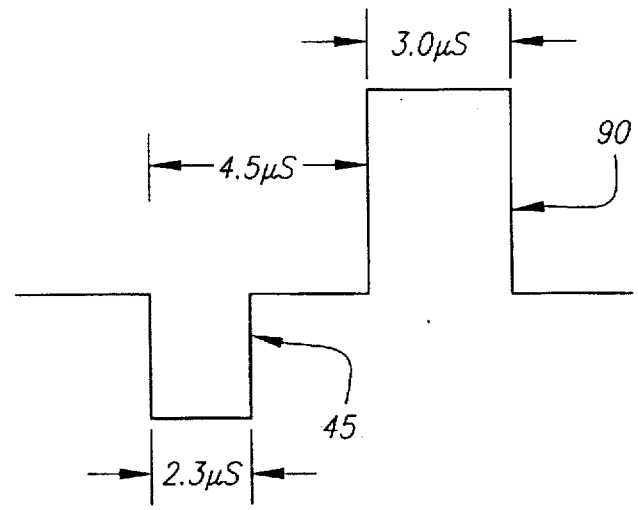

FIGS. 1 through 3 illustrate aspects of existing video signal construction which are useful to understanding the systems and methods, including a preferred embodiment thereof, as presented hereinbelow.

With reference generally to FIG. 1 of the drawings, a representation of the interleaved scanning of a frame 10 of video illustrating numbering of the lines 15 of a frame 10 of video as referenced herein is provided. As is known in the television and video arts, a frame 10 (e.g., one complete picture image as would be seen on a TV screen) is comprised of two fields 20,25 which are scanned (such as by an electron beam) in an interlaced manner. According to present NTSC standards, five-hundred twenty five scanning lines 15 are utilized to recreate one frame 10 of video. Thus, each field comprises two-hundred sixty two and one-half such lines 15. Each of the lines 15 in a field 20,25 represents a horizontal scan (e.g., from left to right) of the frame 10 image. At the end of each scan line 15 the beam is shut off while it is repositioned to the beginning of the next scan line 15. A horizontal sync pulse 30 (see FIG. 2 and 3) positioned after the picture information 35 (see FIGS. 2 and 3) associated with a given line 15 of video triggers the occurrence of this action.

At the end of each field 20,25, i.e., the bottom of the frame 10, the beam is shut off while it is repositioned to the top in order to scan the next field image (which may be either the start of field two 25 of the same frame 10, or the start of field one 20 of the next frame 10). As with the horizontal sync pulses 30, synchronization pulses associated with a vertical retrace or vertical blanking interval (VBI) 40 (see FIG. 2), positioned at the end of the picture and related video signal information for the preceding field 20,25, of video trigger the occurrence of this action. For timing purposes, horizontal line scanning is still maintained during the VBI 40. In this period, equalization 45 and vertical sync 50 pulses perform the function otherwise performed by the horizontal sync pulses 30 with respect to the other video lines 15 in a field 20,25.

It is noted that some TV/Video art (not shown herein), with reference to the five-hundred twenty five lines of a frame of video, identify lines one to two-hundred sixty two and one-half in one field (e.g., field one) and from two-hundred sixty two one-half to five-hundred twenty five in the other (e.g., field two). Other art makes reference to an even/odd line breakdown between fields (e.g., odd number lines are associated with field one, even with field two). For purposes of the disclosure herein, and with reference to FIG. 1, the scanning lines 15 identified herein will be referenced in the immediately following manner.

The VBI 40 (which typically comprises about twenty-one lines) will be referenced herein as the first twenty-one lines (not shown on FIG. 1) of each field 20,25. In addition, the first scanned line 15 of each field 20,25 is referenced herein as line one; thus, the VBI 40 comprises lines one to twenty one each field 20,25. The remaining lines 15 are referenced herein as active video lines, i.e., viewable on a television or other display though, as will be further detailed hereinbelow, some of the lines 15 immediately adjacent the VBI 40 at the top or bottom of each field 20,25 may not actually be viewable depending on the display system used. Furthermore, field one 20 is referenced herein as comprising two-hundred sixty two lines 15 (numbered one to two-hundred sixty two) and field two 25 is referenced herein as comprising two-hundred sixty three lines 15 (numbered one to two-hundred sixty three). Lastly, and with reference to FIGS. 1 and 2, it may be understood that, for purposes herein, line one of each field 20,25 begins at a point corresponding to point a on FIG. 1; likewise, line twenty two of each field 20,25 commences from a point corresponding to that of point b on FIG. 1.

Scanning control (i.e., return of the beam after each horizontal scan and at the end of each field 20,25) is accomplished by means of known synchronization pulses (horizontal 30, vertical 50, and equalizing 45). FIG. 2 illustrates a waveform portion 55 immediately surrounding and including a vertical blanking interval 40. As may be seen, horizontal sync pulses 30 occur at the end of each line 15 in the active video portion 60 which also contains picture information 35 to be displayed. As mentioned above, horizontal scanning is also maintained throughout the VBI 40. Accordingly, horizontal sync pulses 30 are also found in the VBI 40. In addition to the horizontal sync pulses 30 in the VBI 40, certain equalizing pulses 45 and serrations 65 in the vertical sync pulse 50 act as pseudo-sync pulses 30' during a portion of the VBI 40.

In further detail, and with reference to FIGS. 2 and 3, horizontal synchronization in active video portion lines 60, and certain of the lines in the VBI 40, is accomplished via a synchronization pulse 30 incorporated within a horizontal blanking interval 70. As with the VBI 40, the scanning beam is shut off during the entirety of each horizontal blanking interval 70. Detection of a horizontal sync pulse 30 causes the scanning system to deflect the beam back to the opposite side of the image being recorded in order to scan the next line 15. In addition to the horizontal sync pulse 30, each horizontal blanking interval 70 within the active video portion (60 of FIG. 2) contains a back porch region 75 including a color burst portion 80 in which color information for the corresponding picture information 35 is encoded. As noted before, certain equalizing pulses 45, and the vertical sync pulse 50, by their structure, also provide pseudo-horizontal sync pulses 30' which perform the horizontal synchronization function within the VBI 40.

With respect to recording of video signal waveforms, e.g., on a videocassette recorder (VCR), no operation comparable to the retrace function of sync pulses is necessary; however, sync signal levels, and, in particular, horizontal sync pulse 30 levels, are utilized by many VCRs to adjust Automatic Gain Control (AGC) circuitry in order to maintain appropriate levels of the recorded signals for playback purposes. In this regard, VCRs so equipped detect the level of the horizontal sync pulses 30 and adjust the video signal 85 level accordingly, based on expected, standard relationships known in the art.

In accordance with the details set forth above, a preferred embodiment of a system and method for encrypting a video signal 85 in order to effectively prevent useful copying of that signal is described as follows. In brief, and with reference to FIGS. 4(a) and 4(b), a high-amplitude or pedestal pulse 90 is inserted into the video signal 85 following the horizontal sync pulse 30 (and certain of the equalizing pulses 45, as well as serrations 65 of the vertical sync signal 50, both of which serve as psuedo-horizontal sync pulses 30' within the vertical interval 40). In the preferred embodiment described herein, pedestal pulses 90 are inserted in lines two-hundred fifty to two-hundred sixty two of field one 20 (to two-hundred sixty three of field two 25) and lines one through eighteen of the next field 25,20. With respect to active video lines 60 (i.e., lines two-hundred fifty to two-hundred sixty two or two-hundred sixty three, depending upon which field 20,25 is referenced), the inserted high-amplitude pulses 90 are positioned in the color burst portion 80 (see FIG. 3) of the back porch region 75 (see FIG. 3). Thus, the high-amplitude pulse 90 would be inserted in the first eighteen lines 15 of each field 20,25 and in the last twelve to thirteen lines 15 of each field 20,25. These lines were selected based on comparative testing of TV and VCR systems which indicated that, for the majority of the systems, the high-amplitude pulse 90 could be placed as far up as line two-hundred fifty in a field without distortion (e.g., screen darkening, etc.) of the video picture information 35 to be displayed.

Figures 4A, 4B:
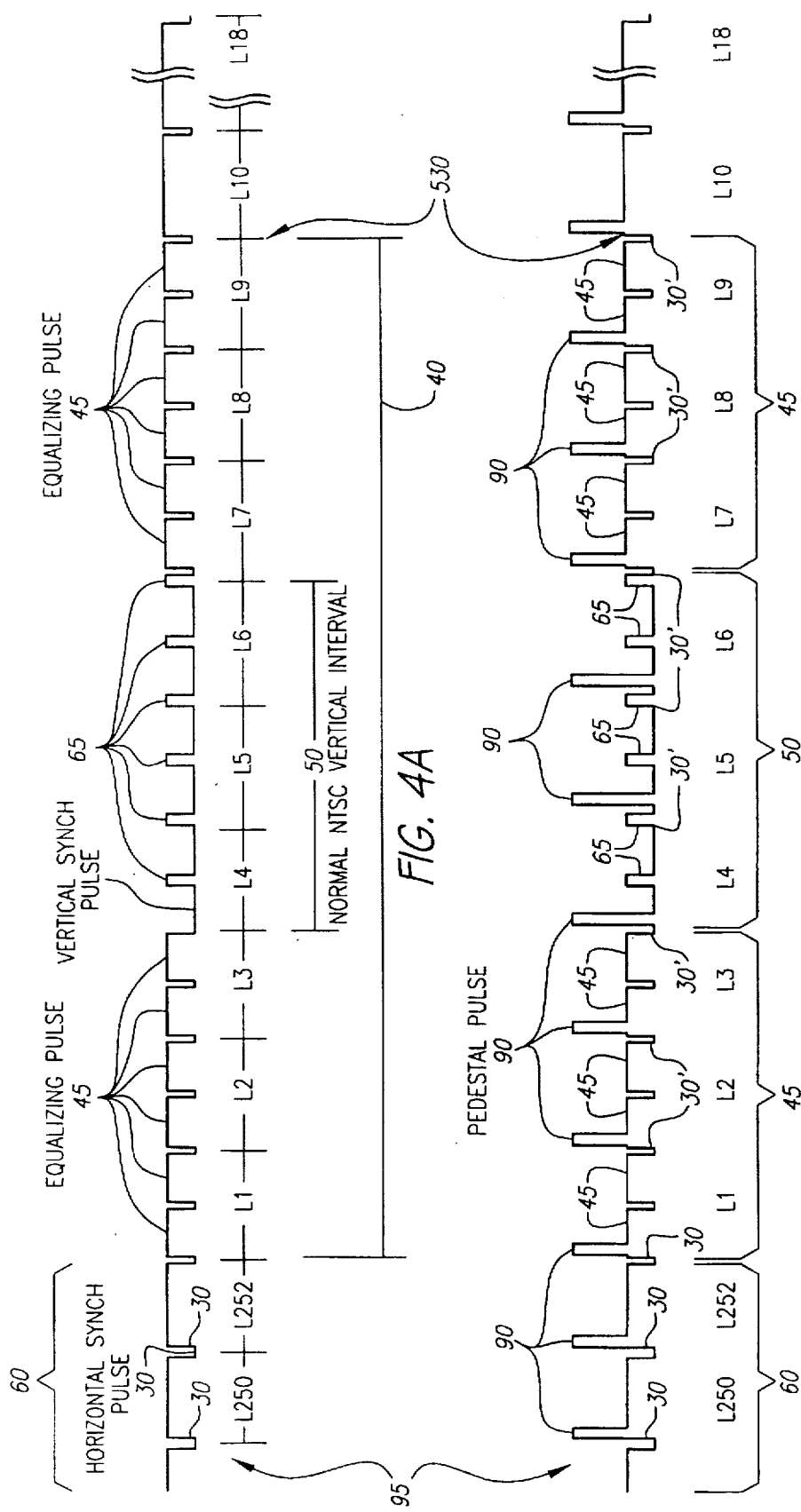
FIGS. 4(a) and 4(b) comparatively illustrate, respectively, a simplified, un-modified video signal (from lines two-hundred fifty through eighteen as provided above), and the same signal with pulses inserted in accordance with the preferred embodiment herein.
Figure 6A:
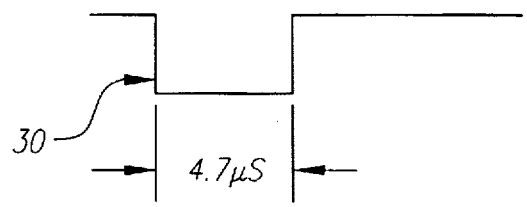
FIGS. 6(a) and 6(b) comparatively illustrate, respectively, a simplified, un-modified video signal horizontal sync pulse, and the same pulse as modified with a pedestal pulse following in accordance with the preferred embodiment herein.
Figure 6B:
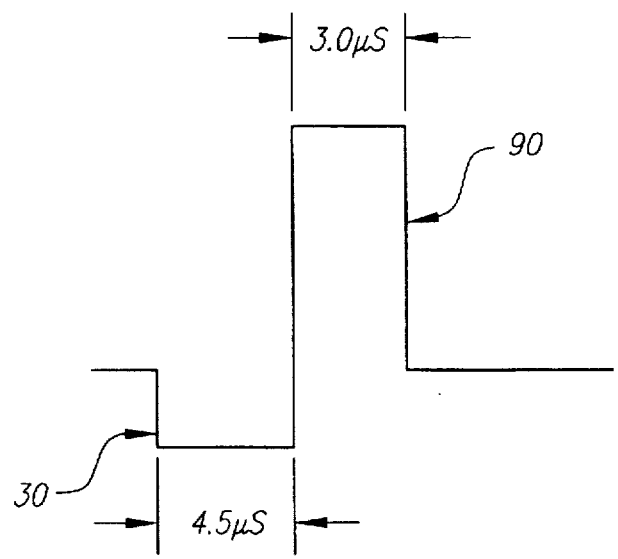

In further detail, FIG. 4a illustrates a normal NTSC video signal 85 waveform portion 95 including part of the VBI 40 and certain lines 15 of active video 60. The waveform portion 95 shows the placement of horizontal sync pulses 30, equalizing pulses 45 and the vertical sync pulse 50 (including serrated portions 65) which are used to maintain timing with respect to line 15 scanning within the VBI 40. Scan line 15 values corresponding to the waveform portions 95 are indicated with "L" followed by the line number (e.g., L250 indicates line two-hundred fifty). Waveform patterns for certain lines 15 (in both FIGS. 4a and 4b) have been omitted (e.g., lines two-hundred fifty one through two-hundred sixty one, and lines eleven through seventeen); the patterns for such lines are repetitive of immediately surrounding line patterns (i.e., lines two-hundred fifty and two-hundred sixty two, and lines ten and eighteen, respectively).

FIG. 4b illustrates the same video waveform portion 95 of FIG. 4a modified in accordance with the preferred embodiment of the present system and method for anti-copying encryption. As shown in FIG. 4b, a high-amplitude or pedestal pulse 90 is inserted immediately following each horizontal sync pulse 30 in the back porch region 75 of the horizontal blanking interval 70 (see FIG. 3). Within the active video portion 60 (see FIG. 2) lines 15 this pedestal pulse 90 is inserted in the color burst portion 80 (see FIG. 3). Within the VBI 40, the pedestal pulse 90 is inserted after the horizontal sync pulses 30' of lines L10 through L18. In addition, a pedestal pulse 90 is inserted after certain equalizing pulses 45, and after certain serrations 65 of the vertical sync pulse 50, each of which serve to provide psuedo-horizontal sync pulses 30' for those corresponding lines L1 through L9 within the VBI 40. FIGS. 5(a), 5(b), 6(a) and 6(b) illustrate, in greater detail, the placement of the pedestal pulse 90 in relation to the normal equalizer pulses 45 (FIGS. 5(a) and (b)), and in relation to the normal horizontal sync pulse 30, 30' (FIGS. 6(a) and (b) ).

Insertion of the pedestal pulses 90 as provided above operates to inhibit effective copying of a video signal in the following manner. As noted previously, VCRs typically incorporate Automatic Gain Control (AGC) circuitry in conjunction with the recording circuitry therein. Such AGC circuitry is utilized to ensure that the video signal 85 is recorded at a proper level so that the signal, upon playback, may be properly detected by and viewed on a television or other display device. Since picture information 35 varies dramatically depending upon its subject matter, the AGC circuitry does not adjust signal levels based on this information. Instead, the AGC circuitry of most VCRs keys off of the more standardized levels comprising the sync signals, and, particularly, the horizontal sync pulses 30, 30' of the video signal 85 waveform.

Insertion of high-amplitude pulses 90 in accordance with the preferred embodiment herein operates to raise the effective level of the signal within the horizontal blanking interval. Accordingly, the AGC circuitry of a recording VCR detects this higher-level signal and reduces the gain of the recorded signal to compensate therefor. When this recorded signal is played back to a television or other display device, the reduction in signal level either results in a signal which is too low to detect at all, or one which is too distorted for proper viewing. Further, since display devices typically do not incorporate AGC circuitry similar to, or for the same purposes as, that used in VCRs, such devices would not alter the signal level in response to the added pedestal pulses 90. In addition, such inserted pulses 90 are added only to lines 15 in the VBI 40, and certain lines 15 in active video portions 60 which are generally not viewable or, if viewable, occur at the extreme top or bottom of the frame 10 of video, where any distortion is less noticeable.

Figure 7:
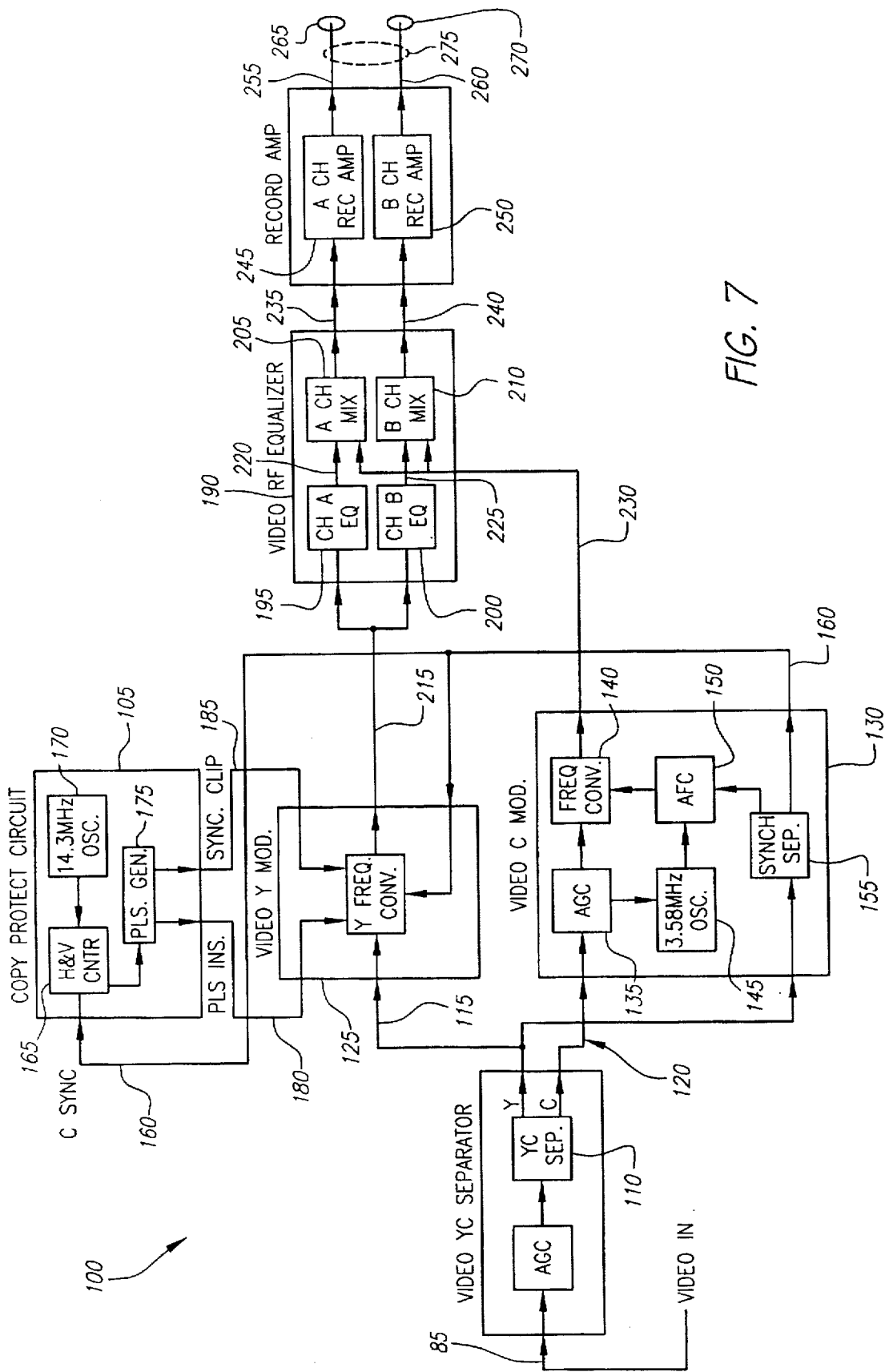
FIG. 7 is a block diagram representing mastering equipment, usable in conjunction with a high speed duplicating system, as modified to include the anti-copy encryption scheme circuitry in accordance with the teachings of the preferred embodiment herein.

FIG. 7 is a block diagram of an exemplary system 100 for applying pedestal pulses 90 to a video signal 85 according to the method of the present invention. In a preferred embodiment, a Sony MMV 800 Mirror Mother Video System, modified as detailed hereinbelow, is utilized to prepare masters of the video material to be mass-reproduced onto videotapes in a high-speed duplication system and process. According to the present method, the pedestal pulses 90 detailed above are encrypted into the video material in the course of the mirror mother mastering process as further described hereinbelow.

With reference to FIG. 7, a mastering system 100 as modified with a copy protect circuit 105 may be utilized as part of a high speed duplication system (not shown) to prepare videotapes in accordance with the present system and method. The system 100 comprises a video luminance/chromenance separator 110 which acts upon an incoming video signal on line 85 to separate that signal into components, on lines 115 and 120, respectively, representing a luminance signal and chromenance signal. Separation into these component signals is effected according to the normal operation of the mastering system 100 (Sony MMV-800), irrespective of whether or not the present system and method are employed, and for reasons of improved processability of the video signal known to those skilled in the art.

The separated luminance signal on line 115 is presented into a video luminance modulator circuit 125 and the chromenance signal is presented into a video chromenance modulator circuit 130. The video luminance modulator circuit 125 operates upon the luminance signal on line 115 to convert same to an FM modulated frequency for further processing as will be more fully described hereinbelow. The video chromenance modulator circuit 130 generates the color information associated with the video signal on line 85 and, in particular, the chromenance signal on line 120, under carrier frequency in a manner and for reasons known to those skilled in the art.

To the latter end above, the video chromenance signal on line 120 is provided to an Automatic Gain Control (AGC) circuit 135 which, in turn, is connected to a frequency conversion circuit 140 and an oscillator 145 (which may, for example, be set to establish a 3.58 Megahertz frequency). An Automatic Frequency Control (AFC) circuit 150 is connected between the oscillator 145 and the frequency conversion circuit 140 for further control of frequency in light of signal information provided by the luminance signal on line 115 as indicated hereinbelow. The video chromenance modulator circuit 130 also receives the luminance signal on line 115 into a sync separator circuit 155 which outputs sync information for use by the AFC circuit 150 in the color generation process. The sync separator circuit 155 further outputs a composite sync signal 160 which is input to the video luminance modulator circuit 125 for use in the frequency modulation process performed therein, and which is input into the copy protect circuit 105 as detailed below.

In accordance with the present method, the copy protect circuit 105 is utilized to generate and insert a pulse of three microsecond duration and 130 IRE units magnitude in positions associated with the horizontal synchronization of the video signal on line 85 from lines two-hundred fifty of one field 20,25 to line eighteen of a next field 25,20 (including, with reference to FIGS. 3 and 4, horizontal sync pulses 30, equalization pulses 45, and serrations 65 of the vertical sync pulse 50) as detailed hereinabove. The copy protect circuit 105 comprises an horizontal and vertical control circuit 165 receiving as one input the color sync signal 160 from the sync separator circuit 155 of the video chromenance modulator 130, an oscillator 170 (which may, for example be set to establish a 14.3 Megahertz frequency) providing another input to the horizontal and vertical control circuit 165, and a pulse generator 175 which receives the output from the horizontal and vertical control circuit 165 and generates a pulse insertion signal on line 180 which, in turn, is provided to the video luminance modulator circuit 125 to effect insertion of the pedestal pulse 90 (as shown in FIG. 4(b).

A sync clip signal on line 185 is also provided from the pulse generator 175 in order to limit negative going sync pulses 30 to a minus 30 IRE units magnitude. The negative going sync pulses are normally minus 40 IRE units in magnitude; reduction in accordance with the system and method herein serves to create additional synchronization errors adding to the resulting distortion of a copy of the video signal when played back on a display. Tests have shown that the parameters detailed above provide suitable performance across the widest variety of component (i.e., VCR and TV Received/Monitor) combinations presently available.

A video RF Equalizer circuit 190 is further incorporated into the mastering system 100 and comprises an equalizer circuit for channel A 195 and for channel B 200, and a mixing circuit for channel A 205 and for channel B 210. Both of the equalizer circuits 195, 200 receive, as an input, the FM modulated luminance signal on line 215 which is output from the video luminance modulator circuit 125. The output from the channel A equalizer circuit 195 is a signal on line 220 comprising channel A information which has been equalized in a manner known to those skilled in the art. Likewise, the output from the channel B equalizer circuit 200 is a signal on line 225 comprising channel B information which has been equalized. These equalized signals 220, 225 are passed, respectively, to the corresponding channel A mixing circuit 205 and channel B mixing circuit 210. A second input to each of the mixing circuits 205, 210 is the modulated chromenance signal on line 230 provided by the video chromenance modulation circuit 130, and which comprises color information generated under carrier frequency as detailed above.

The channel A mixing circuit 205 operates to combine the equalized channel A signal on line 220, representing luminance information associated with the video signal on line 85, with the modulated chromenance signal on line 230, representing color information associated with the video signal on line 85. Likewise, the channel B mixing circuit 210 operates to combine the equalized channel B signal on line 225, representing luminance information associated with the video signal on line 85, with the modulated chromenance signal on line 230, representing color information associated with the video signal on line 85. The channel A and channel B output signals on lines 235, 240 of the video RF equalizer circuit 190 are then input, respectively, into a channel A Record Amplifier circuit 245 and a channel B Record Amplifier circuit 250 to provide suitable amplification of these signals for high speed recording to videotape as known to those skilled in the art. In a final phase, the output signals on lines 255, 260, from of the channel A and channel B record amplifier circuits 245, 250 are presented, respectively, to corresponding channel A and channel B video heads 265, 270 for duplication of the video signal on line 85 as modified above onto videotape, and for subsequent high-speed duplication to other videotapes.

As noted previously, it has been found through comparative testing that a two microsecond pedestal pulse 90 (as measured with respect to the video signal on the videotape being copy protected) inserted in the back porch 75 of the horizontal sync 30, et al., pulses, yields the most suitable copy-protection performance (i.e., adequate distortion with respect to illegitimately copied tapes when played back, yet minimally perceived distortion of video material upon playback of legitimate videotape) over the widest array of VCR and TV Receiver/Monitor combinations presently in the market. As a result of bandwidth limiting in the electronics of the mastering equipment 100, i.e., the Sony MMV 800 in the preferred embodiment herein, it has been found that insertion of a three microsecond pulse from the pulse generator 175 into the luminance signal component on line 115 of the video signal on line 85 yields such a two microsecond pulse in the final signal on line 275 duplicated onto the copy-protected videotapes. Further, testing has indicated that a pulse 90 amplitude of 130 IRE units enables playback of legitimate tapes from a VCR without objectionable distortion, yet provides sufficient distortion when illegitimate copies are made. By inserting the additional pulse 90 in the manner indicated hereinabove, i.e., within the mastering equipment 100, the pulse may be driven to a maximum amplitude of 130 IRE units, as opposed to the 100 IRE units maximum if inserted in the original video signal on line 85 presented as an input to mastering equipment 100, before clipping takes place in the mastering equipment 100 electronics. The modification of the horizontal synchronization pulse 30 negative amplitude from a −40 IRE unit level to a −30 IRE unit level is envisioned to assist in the loss of synchronization of the video picture when viewing an illegitimate copy. It has been found that modification of the video signal as provided above does not cause any noticeable black shift in the range of TV receivers presently available, yet still provides the maximum video signal reduction by the AGC circuits of a recording VCR (and, thus, provides a highly distorted picture when the copy VCR tape is played back to a TV receiver).

Figure 8:
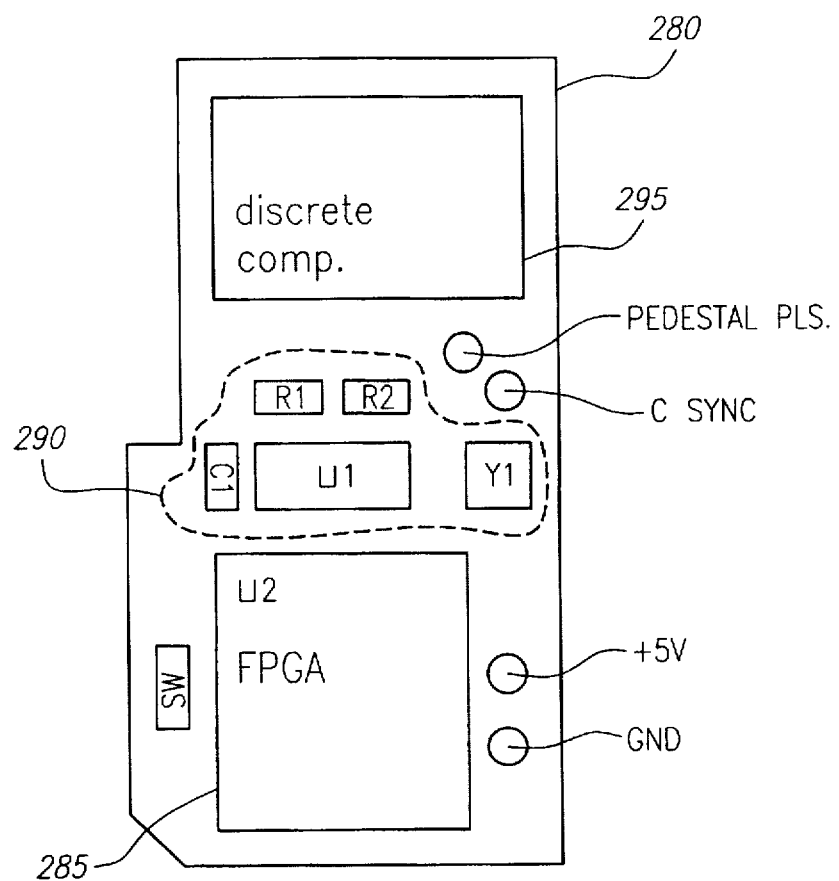
FIG. 8 is a diagrammatic representation of circuit board providing the anti-copying encryption scheme circuitry of FIG. 7.

FIG. 8 illustrates the components of a logic board 280 which may be incorporated as a modification to a mastering system 100 (see FIG. 7), such as a Sony MMV-800 Mirror Mother System, in order to provide for the insertion of pedestal pulses 90 in accordance with the preferred embodiment herein. As shown in FIG. 8, and further explained in detail hereinbelow with respect to the remaining FIGS., the logic board 280 comprises a Field Programmable Gate Array (FPGA) component 285, an external clock 290, and a discrete component 295.

With reference back to FIGS. 1–6, the logic board 280 of FIG. 8 is interfaced with the existing video luminance modulation circuit 125 (e.g., the "YMD board" of the MMV-800 system) to provide the ability to add a high level pedestal pulse 90 (130 IRE) to the back porch 75 of the horizontal sync pulse 30 starting at line two hundred and fifty at the end of a field 20,25 and continuing through the vertical interval 40 to line eighteen of the next field 25,20. The presence of these pedestal pulses 90 in the mirror mother tape will be transferred during the high speed duplication process to standard VCR cassettes. A second function provided by the logic board 280 allows for the previously noted reduction of the negative going synchronization pulses in the video signal on line 85 from a minus forty (–40) IRE level to a minus thirty (–30) IRE level. When a copy of the primary VCR cassette is attempted, the AGC circuit in the input of the copying VCR will sample the high amplitude pulses 90 on the back porch 75 of the synchronizing pulses 30 and reduce the amplitude of the video signal on line 85 being recorded to a level that, when played back, will be further distorted and non-viewable.

Figure 9A:
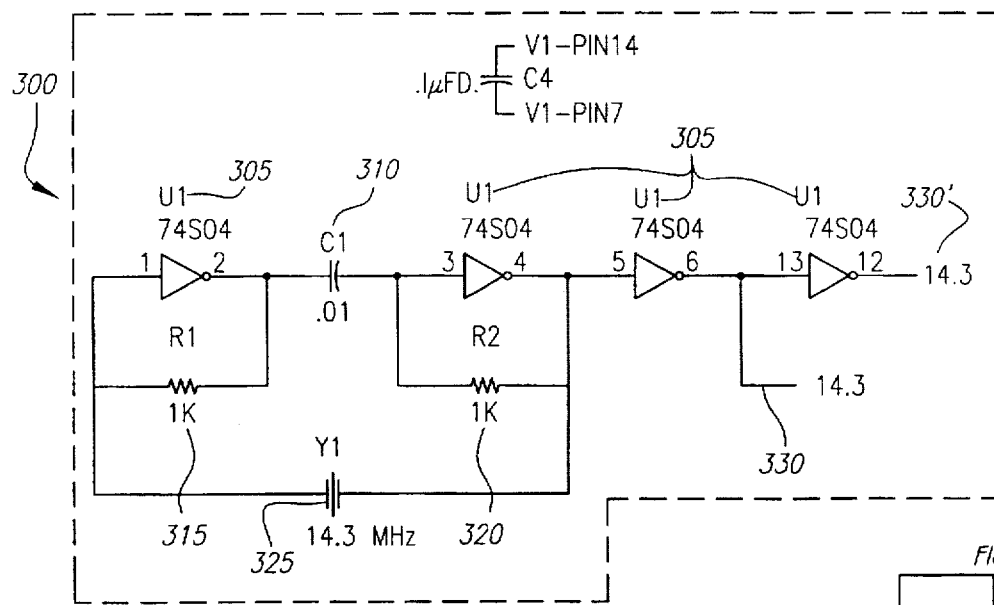
FIG. 9 is a schematic representation of the components incorporated in the circuit board of FIG. 8 in accordance with the preferred embodiment herein; and, FIGS. 10 through 13 are a series of schematic representations of the logic incorporated into the field programmable gate array device of FIGS. 8 and 9 in accordance with the preferred embodiment herein.
Figure 9A:
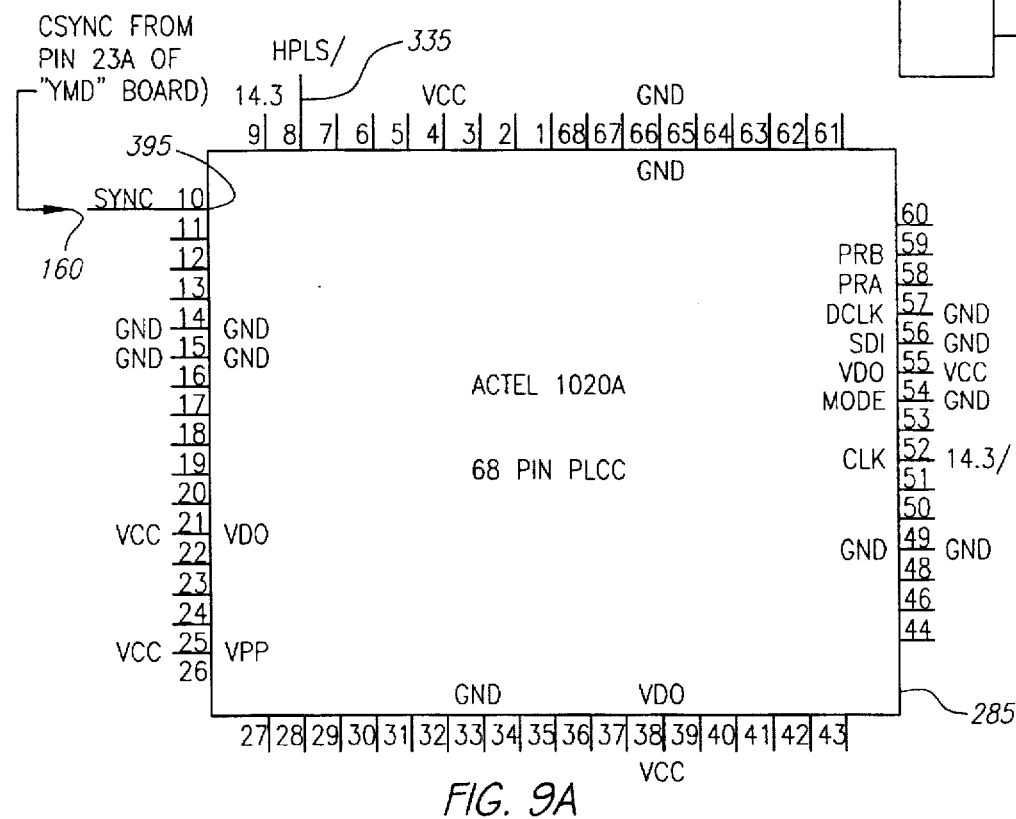
Figure 9B:
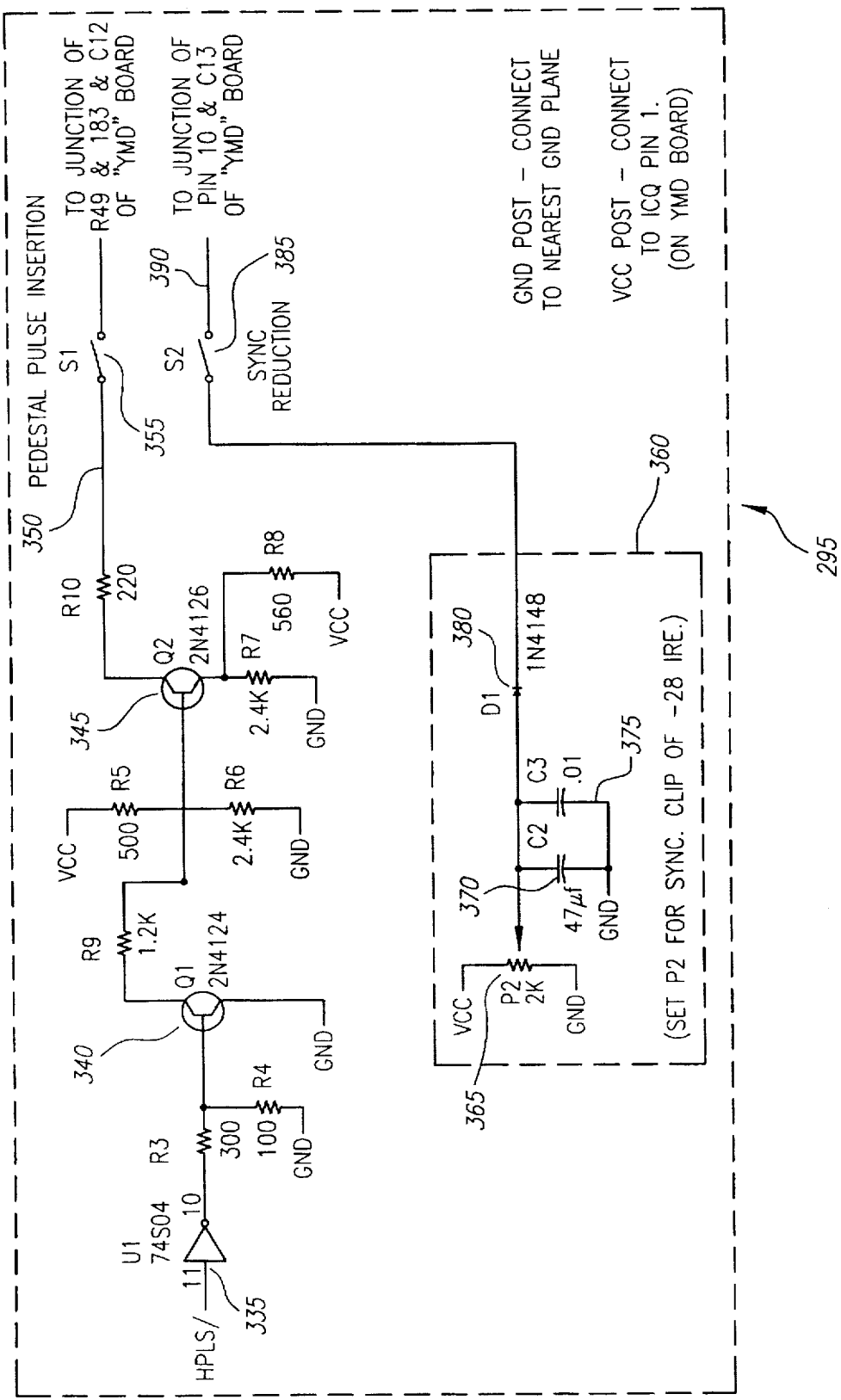

A more detailed schematic representation of the logic board 280 of FIG. 8 is provided in FIG. 9. With reference to this latter figure, all timing is derived by logic contained in a Field Programmable Gate Array logic chip (FPGA) 285, which may, e.g., be an Actel 1020A chip as manufactured by Actel Corporation. External clocking 290 is provided by a crystal controlled oscillator 300 comprised of a 74LS04 chip 305, a capacitor 310, two resistors 315, 320, and a crystal 325 of, e.g., 14.3 MHZ frequency. The oscillator 300 provides complementary output signals 330, 330' to the FPGA chip 285. With reference to both FIGS. 7 and 9, the FPGA chip 285 also receives as an input the composite sync signal (CSYNC) 160 from the video luminance modulator circuit 125 (e.g., pin 32A of the YMD board of the Sony MMV-800 system). The circuitry in the FPGA chip 285 synchronizes with the composite sync signal 160 and generates an HPLS/ signal 335. The HPLS/signal 335 is, in turn, provided to the discrete component 295 and is used to drive transistor Q1 340 and transistor Q2 345 which will provide a positive pulse on the pedestal pulse insertion line 350. A switch (S1) 355 controls application of this positive pulse on the pedestal pulse insertion line 350, which is then provided back to the video luminance modulator circuit 125 (e.g., at the junction of R49 & R183 & C129 of the "YMD board" of the Sony MMV-800 system). As will be further detailed hereinbelow, the FPGA chip 285 adjusts the timing of the HPLS/signal 335 in order to compensate for any circuit propagation delays that may occur in the video luminance modulator circuitry 125.

The negative synchronization pulse reduction (which, as previously identified is a second function provided by the logic board 280) is accomplished by a clipping circuit 360 comprising a potentiometer 365, two capacitors 370, 375, and a diode 380. The clipping circuit 360 limits the negative excursion of the video signal on line 85 and, therefore, clips the normal negative-going horizontal synchronization pulses 30 (with reference to FIGS. 4(a) and (b)). A switch (S2) 385 on the sync reduction line 390 controls application of the synchronization pulse reduction function to the video luminance modulator circuit 125. Since the entire video signal on line 85 sits at a positive level in the video luminance modulator circuit 125 (e.g., at the junction of R49 and R183 of the "YMD board" of the Sony MMV-800 System) where the sync reduction line 390 of the logic board 280 interfaces (at the junction of Pin 10 & C13), adjusting the D.C. voltage provided by the potentiometer 365 limits the negative direction of the signal if it is more negative than the voltage provided to the diode 380.

With reference to FIGS. 10 through 13, the programming of the FPGA chip 285 circuitry of FIGS. 8 and 9 is described in greater detail hereinbelow. The composite sync signal (CSYNC) 160 is input to pin ten 395 of the FPGA chip 285. This CSYNC signal 160 is buffered and inverted to provide signals SYNC 400 and SYNC/405. As shown on FIG. 12, the SYNC signal 400 is input to a D flip-flop 410 at the initial stage of a sub-circuit 415 which generates the pulse HDRCLR/pulse 420 (which may, for example, be a 70 nanosecond pulse) at the leading edge of the SYNC pulse 400. The HDRCLR/pulse 420 is provided to a J-K flip-flop 425 and sets the output, signal HDR 430. The HDRCLR/ pulse 420 is also provided to a three stage counter 435, via signal HDRCLRA/440, HDRCLRB/445, and HDRCLRC/ 450, and is used to clear the counter 435. The HDR signal 430 remains set until the counter 435 reaches a count of 640, which is past the half interval, thus resetting the flip-flop 425, and signal HDR 430 (which may, for example, provide the equivalent of a 45 microsecond delay). The HDR signal 430 is a gating function for the generation of the signal HDRCLR/420, thus it blocks any half line equalizer pulses that are contained in the composite sync.

Figure 10A:
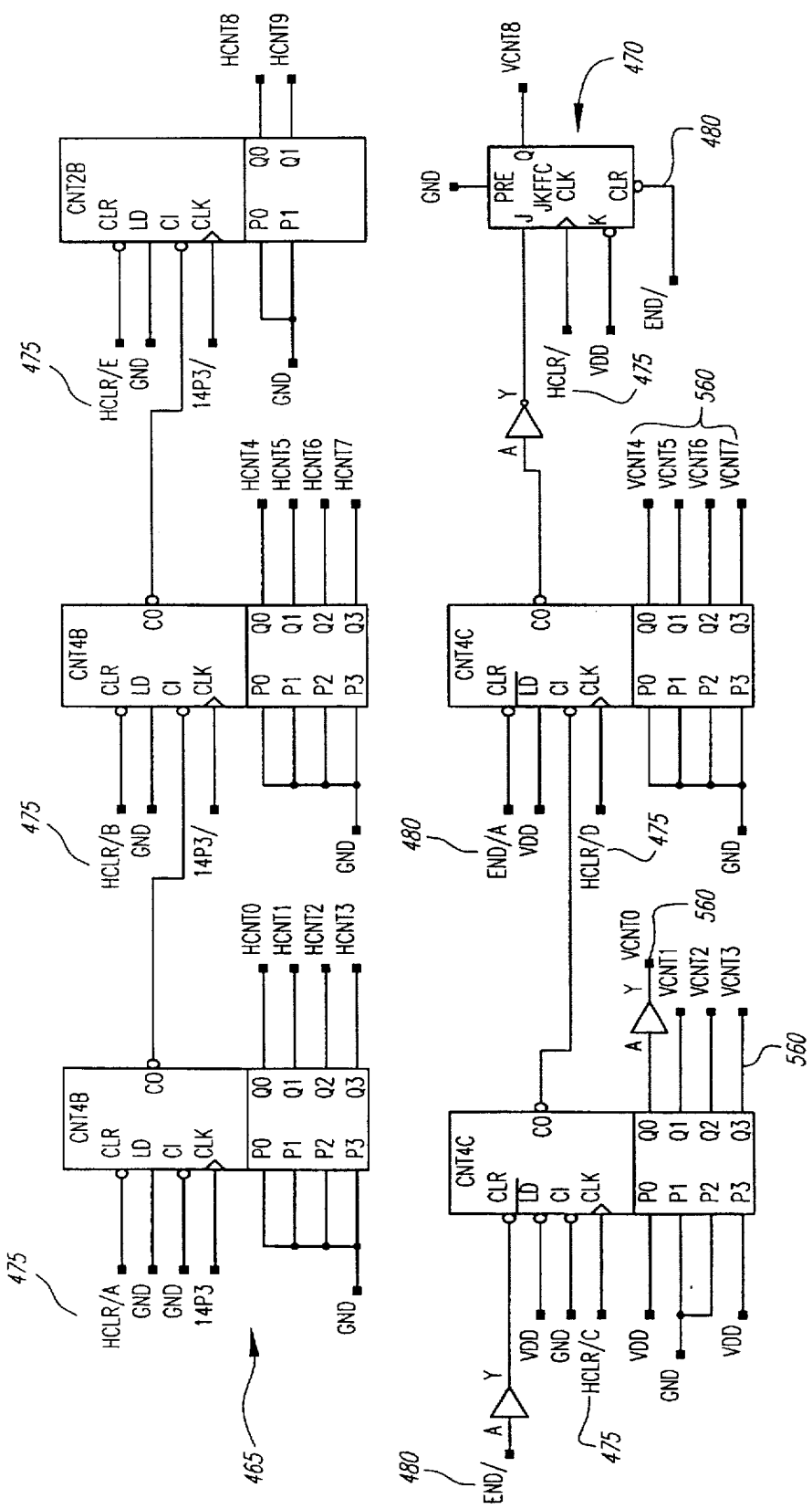
Figure 10B:
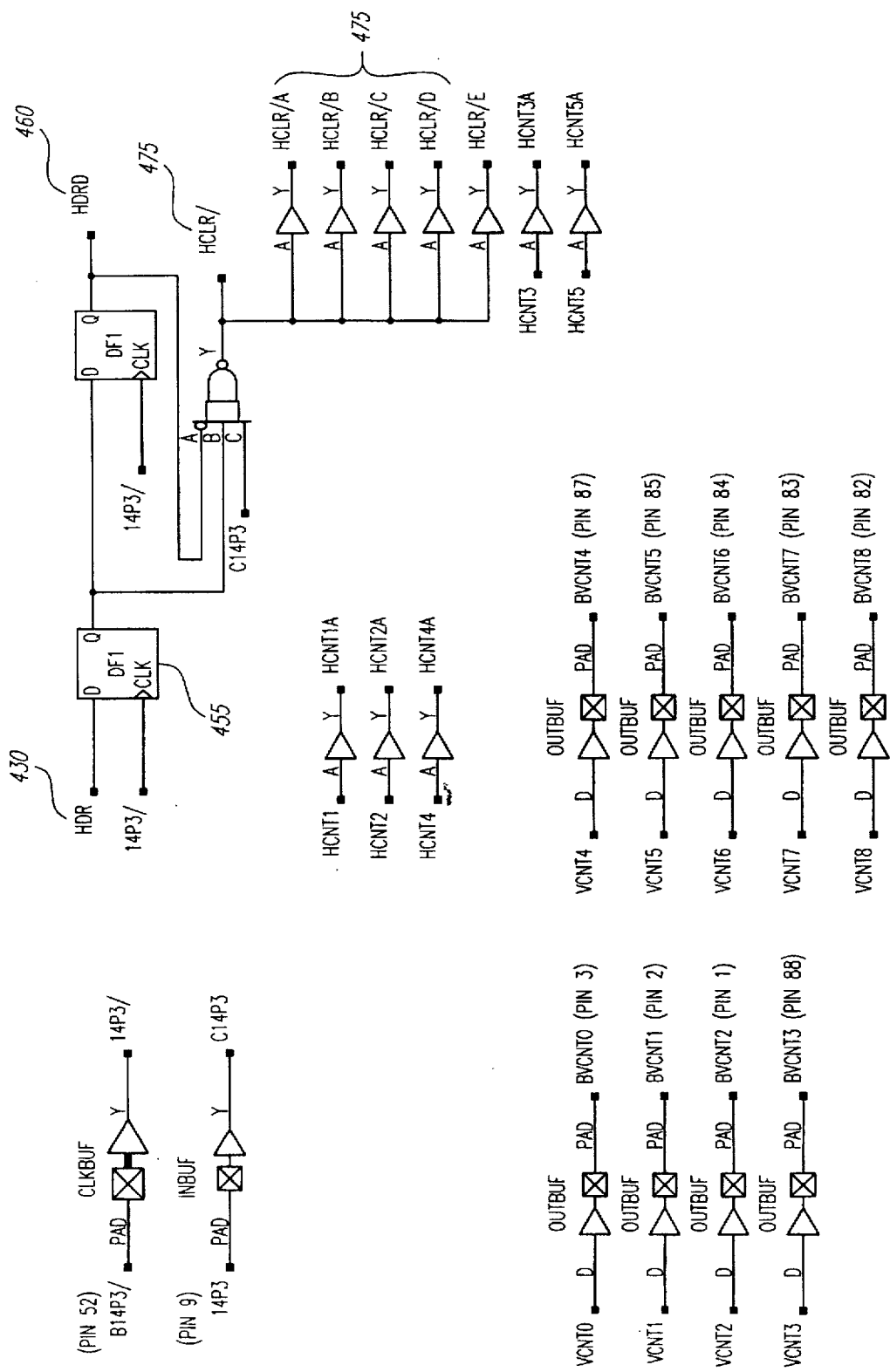

The HDR signal 430 is also brought to a D flip-flop 455 (as shown in FIG. 10) where an HDRD pulse 460 is generated (which may, for example, be a 70 nanosecond pulse) to provide a clearing function for the horizontal timing counter 465 and a clock for the vertical line counter 470 via signal HCLR/475. The vertical line counter 470 is cleared by the END signal 480 which represents the end of field.

Figure 11A:
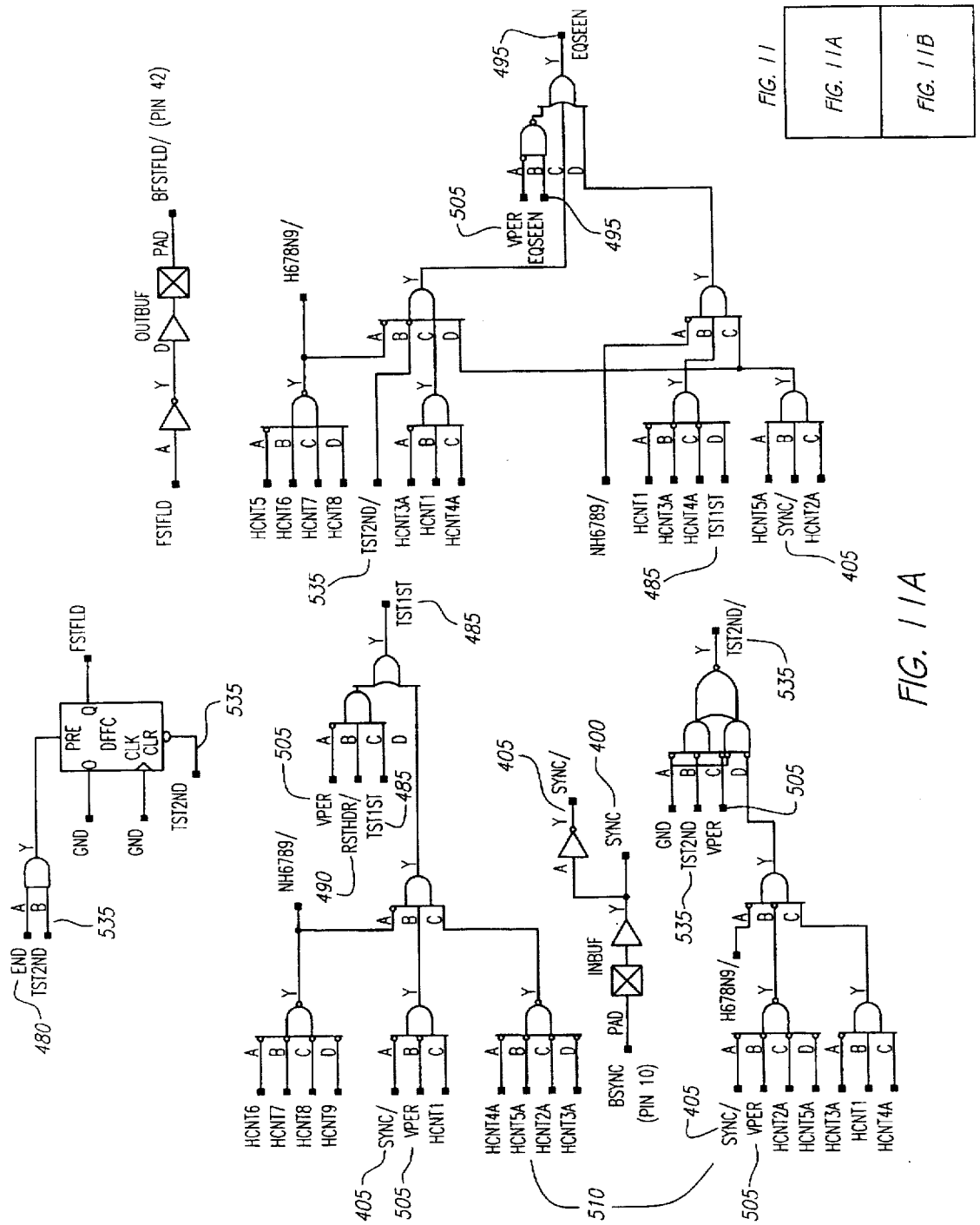
Figure 11B:
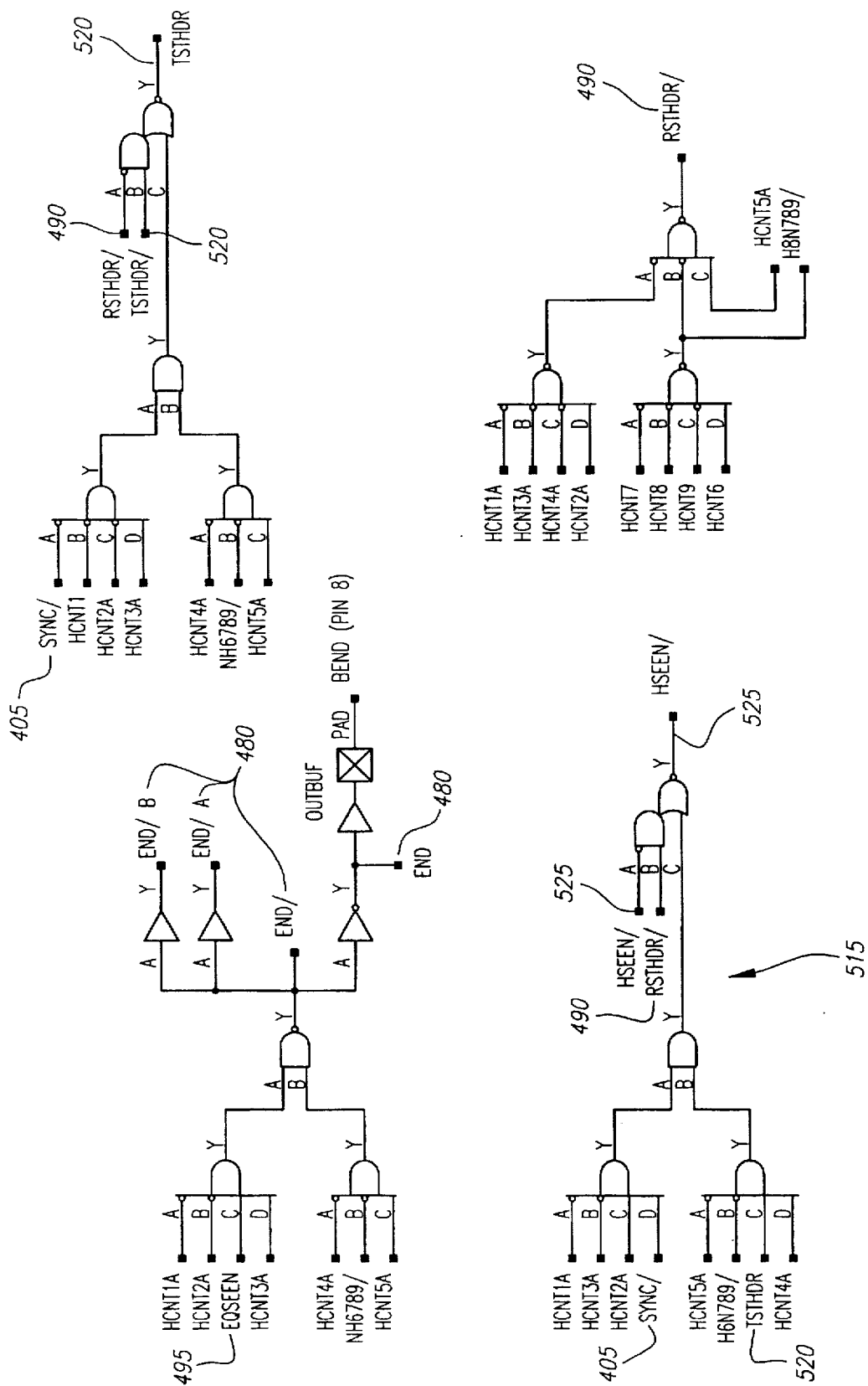
Figure 12:
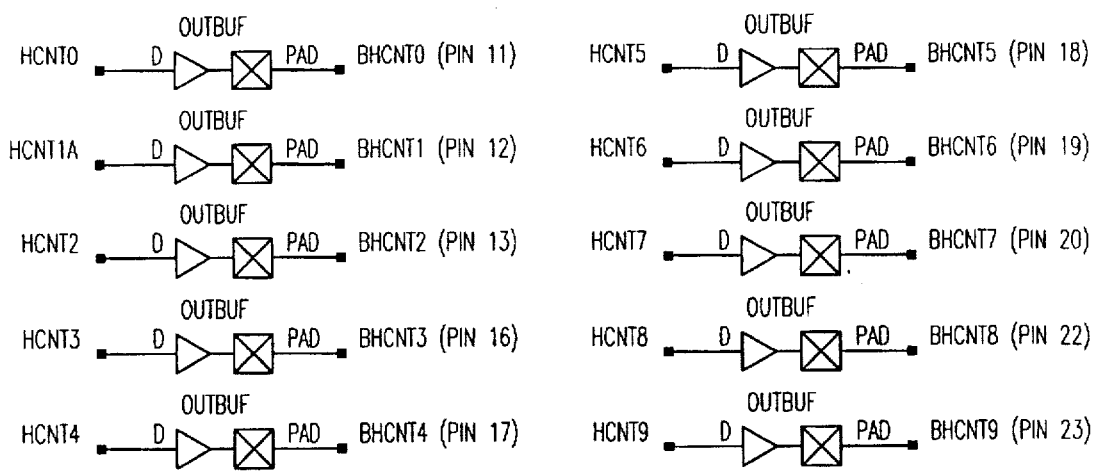
Figure 12:
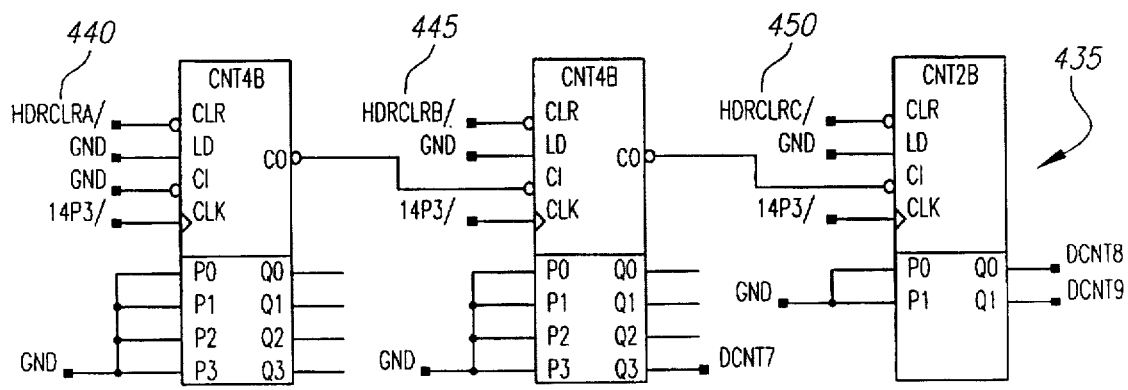
Figure 12:
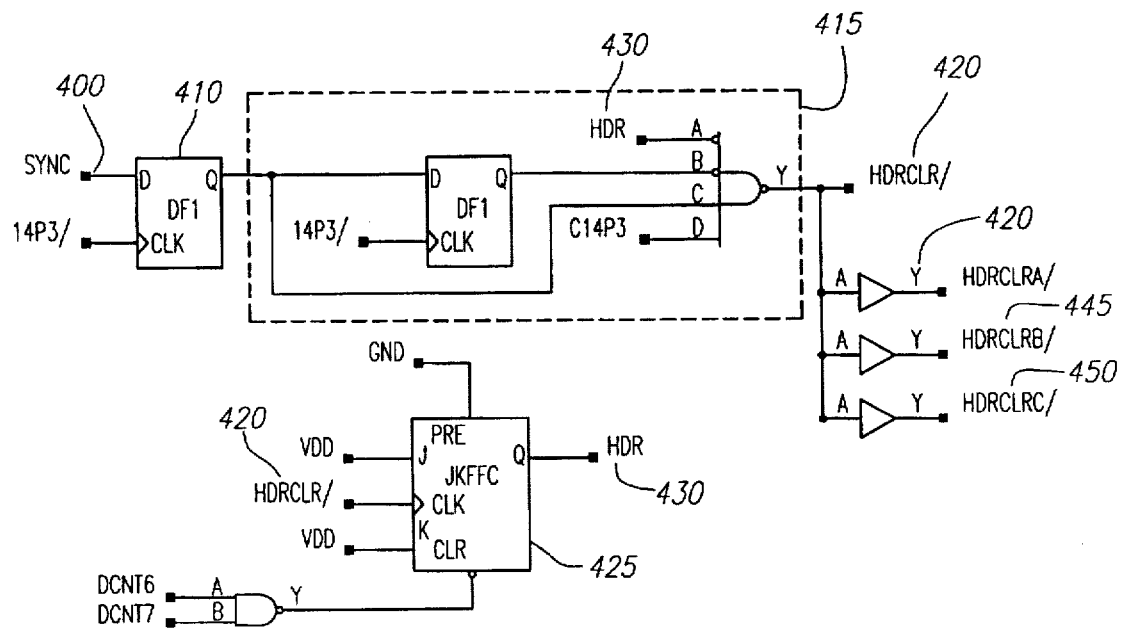

Generation of the END signal 480 is illustrated in FIG. 11, and is achieved in two ways. An equalizer pulse 45 is detected in the place of a horizontal sync pulse 30 at the end of field one 20 by signal TST1ST 485, which is sync detected at a timing sample (which may, e.g., be 0.7 microseconds) from the lead edge of the SYNC pulse 400. The TST1ST 485 signal is reset by the signal RSTHDR/490, which occurs at a second timing sample (which may, e.g., be 7 microseconds) from the lead edge of the SYNC pulse 400. If the SYNC pulse 400 has ended before the EQSEEN signal 495 is set (which, in a preferred embodiment may be a 2.52 microsecond period deriving from the lower logic rail of the "EQSEEN" function 495), the END signal 480 is set after a certain time period (which may, e.g., be 2.8 microseconds) from the lead edge of the SYNC pulse 400. The END pulse 480 is also provided to the J-K flip-flop 500 (as shown on FIG. 13) and sets the VPER signal 505. This VPER signal 505 blocks the gating chains 510 (as shown on FIG. 11) from looking at the sync train during the vertical interval 40. The VPER signal 505 is reset by the first full width horizontal SYNC pulse 400 detected by the HSEEN/circuit 515 (as shown in FIG. 11). The HSEEN/circuit 515 tests the SYNC pulse 400 at a certain time period (which may, e.g., be 3.9 microseconds) from the lead edge of the SYNC pulse 400 to see if it is wide enough using the TSTHDR signal 520 and then generates the HSEEN/signal 525 at a sample time (which may, e.g., be 5.8 microseconds) from the lead edge of SYNC 400. The first normal width horizontal sync pulse occurs in vertical line ten 530 (see FIG. 4(b)).

The END pulse 480 for field two 25 is generated (by the upper logic rail of "EQSEEN" function 495) by the TST2ND/signal 535 which detects a SYNC pulse 400 at a half line interval (e.g., 32.6 microseconds) and remembers it until the VPER signal 505 is set. An END pulse 480 is then caused to be generated upon the next occurrence of a SYNC pulse 400.

Figure 13:
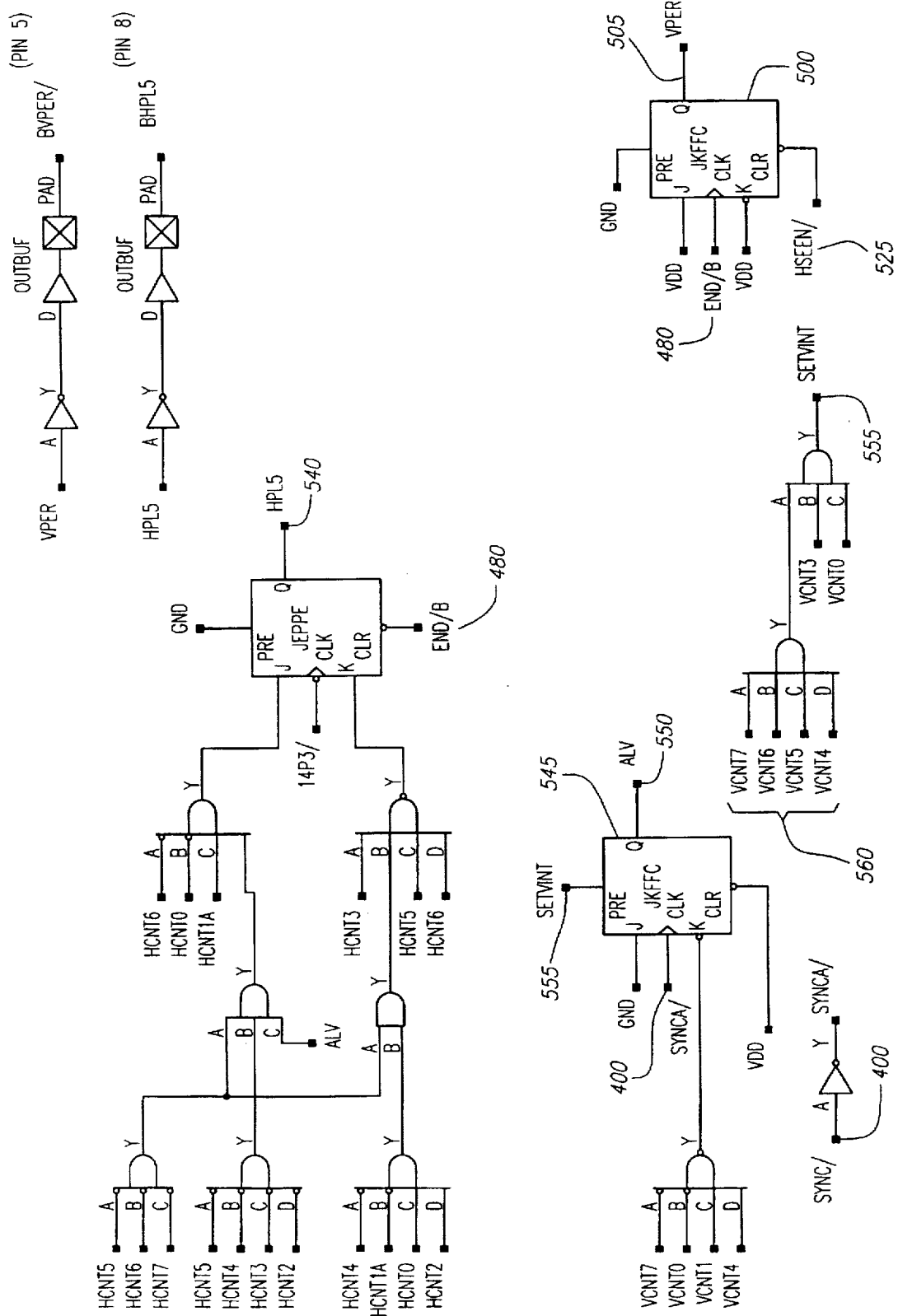

The back porch 75 pedestal pulse 90 is provided as the HPLS signal 540, which may be generated by circuitry as illustrated in FIG. 13. A J-K flip-flop 545 controls the pulse generation in the vertical interval 40 through the ALV signal 550 output therefrom. A SETVINT signal 555 is generated by a line count of 249 on lines 560 provided from a counter 470 (as shown on FIG. 10), and is provided to the J-K flip-flop 545 to set the ALV signal 550. The ALV signal 550 is reset by a line count of 18 on lines 560 from the counter 565. When the ALV signal 550 is set, the HPLS signal 540 will be set at a certain time period (e.g., 4.69 microseconds) from the lead edge of SYNC 400, and will reset at a second time period (e.g., 7.63 microseconds) from the lead edge of SYNC 400, in order to provide a pulse 90 of approximately 3.0 microseconds duration (width).

It is noted that the delay in the start of the pulse 90 is to compensate for the propagation delay that exists between the CSYNC signal 160 (on the "YMD board" of the Sony MMV-800), and the video signal on line 85 (at the junction R49 and R183 on that board). It is further noted that the values herein identified are meant to be exemplary of possible operation according to the preferred embodiment herein. Such values are not meant to be limiting of the scope of the system or method herein described, nor of the claims appended hereto. Indeed, certain of the values herein provided, including those related to modifications of the video signal and those related to the circuit modifications to the mastering equipment, derive from testing on presently available TV receivers, VCRs, and from the use of a Sony MMV-800 mastering system in accordance with the preferred embodiment described herein. Some modification of values provided herein may be expected for application of the present system and method with other combinations of equipment; and, such modifications are intended to be within the scope of the present system and method. To be sure, having described the invention in detail, and by reference to preferred embodiments thereof, it will be apparent that other modifications and variations are possible without departing from the spirit and scope of the invention defined in the appended claims.

What is claimed is:

1. A method of encrypting a video signal to be placed legitimately onto a recording medium so as to prevent the useful copying of said video signal from that medium, said video signal comprising consecutive frames of picture information, each of said frames being represented in two fields, each of said fields having a vertical interval associated therewith which indicates the start of each said field, and each of said fields further comprising lines, including active and viewable lines, active but non-viewable lines, and non-active lines, and each of said lines having horizontal sync pulses or other reference points for performing horizontal synchronization function indicating the end of each of said lines, comprising the steps of:

separating said video signal into a luminance component and a chromenance component;

inserting a high-amplitude pulse having a width of no more than about three microseconds into said luminance component of said video signal immediately after said horizontal sync pulse or other reference point for performing a horizontal synchronization function in certain of said active but non-viewable lines and certain of said non-active lines;

mixing said luminance component and said chromenance component to yield an encrypted video signal, wherein the width of said high-amplitude pulse in said encrypted video signal is less than the width of said high-amplitude pulse as inserted into said luminance component; and, transferring said encrypted video signal onto the recording medium.

2. The method of claim 1 wherein said two fields comprise a first field and a second field, said first field further comprising two-hundred sixty two of said lines and said second field comprising two-hundred sixty three of said lines, and wherein said high-amplitude pulse is inserted in the first eighteen and the last twelve of said lines of said first field and in the first eighteen and the last thirteen lines of said second field.

3. The method of claim 1 wherein said high-amplitude pulse has an amplitude of 130 IRE units and a width of three microseconds when inserted into said luminance component and an amplitude of 130 IRE units and a width of two microseconds after said mixing of said luminance component and said chromenance component.

4. A video mastering system comprising:

separator circuitry for receiving a video signal comprising lines of video information and for separating said video signal into a luminance component and a chromenance component;

copy protect circuitry for generating a high-amplitude pulse having a width of no more than about three microseconds and for effecting the insertion of said high-amplitude pulse into said luminance component in at least one position corresponding to a line of said video signal; and, output circuitry for combining said chromenance signal with said luminance signal having said high-amplitude pulse inserted therein and for presenting said combined signal for preparation of a video master recording, wherein the width of said high-amplitude pulse in said combined signal is less than the width of said high-amplitude pulse as inserted into said luminance component.

5. The video mastering system of claim 4 wherein said high-amplitude pulse generated has an amplitude of 130 IRE units and said copy protect circuitry effects insertion of said high-amplitude pulse so as to maintain an amplitude of 130 IRE units throughout said output circuitry.

6. The video mastering system of claim 4 wherein said high-amplitude pulse generated has a width of three microseconds.

7. The video mastering system of claim 6 wherein said output circuitry results in reduction of the width of said high-amplitude pulse from three microseconds to two microseconds in said combined signal.

8. The video mastering system of claim 4 wherein the medium utilized for said video master recording is videotape.

9. A copy protect circuit for generating a high-amplitude pulse and effecting insertion of said high amplitude pulse into a video signal at a predetermined point, comprising:

an oscillator providing an oscillator signal;

a control circuit, said control circuit receiving said oscillator signal and a signal relative to said video signal, said control signal further providing an output; and, a pulse generator, said pulse generator receiving said output of said control circuit and providing a high-amplitude pulse having a width of no more than about three microseconds at an output thereof, wherein said video signal comprises separated luminance and chromenance components and said high amplitude pulse is inserted into the luminance component for later combination of said luminance and chromenance components so as to yield an output video signal wherein the width of said high amplitude pulse is less than the width of said high amplitude pulse as inserted into said luminance component.

10. The copy protect circuit of claim 9 wherein said high-amplitude pulse comprises a pulse of 130 IRE units amplitude and three microseconds pulse width.

11. The copy protect circuit of claim 9 wherein said pulse generator further provides a sync clip signal for clipping negative values of said video signal to minus thirty IRE units.

* * * * *